May 18, 1926.

J. W. GAULT 1,585,610

PET COCK OPERATING DEVICE

Filed May 23, 1924

Inventor

John W. Gault.

By Lacy & Lacy, Attorneys

Patented May 18, 1926.

1,585,610

UNITED STATES PATENT OFFICE.

JOHN W. GAULT, OF CYNTHIANA, KENTUCKY.

PET-COCK-OPERATING DEVICE.

Application filed May 23, 1924. Serial No. 715,382.

This invention relates to an improved pet cock operating device for motor vehicles of the make employing a pair of pet cocks upon the engine flywheel case for the purpose of testing the level of the oil contained in the case and seeks, among other objects, to provide a device which may be permanently mounted upon a vehicle and so constructed that a single device will serve for operating both pet cocks.

The invention seeks, as a further object, to provide a device employing a spring for holding the device engaged with either pet cock and wherein the spring will be of a length to compensate for the relative lateral spacing of the pet cocks and press the device into engagement with either pet cock with substantially equal force.

And the invention seeks, as a still further object, to provide a device which will be of particularly simple construction, which may be assembled at minimum expense, and which may be readily applied.

Other and incidental objects will appear hereinafter.

Figure 1:
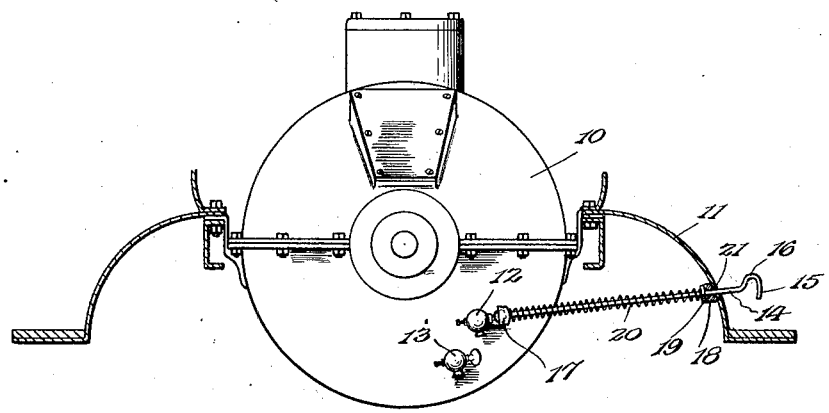
Figure 1 is a sectional view showing my improved device applied.
Figure 2:
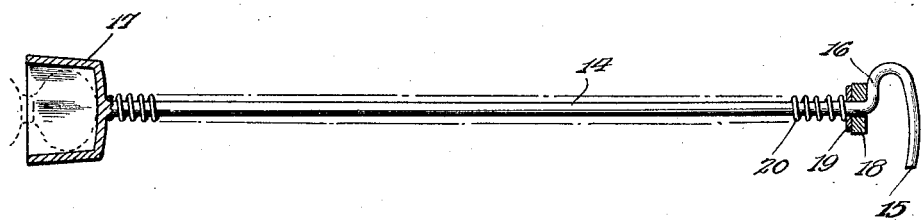
Figure 2 is a detail view of the device, parts being in section.
Figure 3:
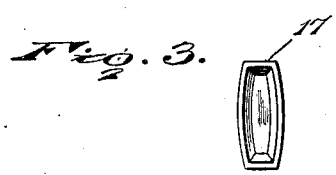
Figure 3 is an end view of the socket of the device.

Referring now more particularly to the drawings, I have shown my improved device in connection with the pet cocks of the flywheel case 10 of a conventional motor vehicle, one of the running board shields of which is indicated at 11. The pet cocks are designated at 12 and 13 and as will be observed, said pet cocks are mounted upon the rear wall of the flywheel case in vertical spaced relation and are also spaced transversely with respect to each other, this being the usual position of the pet cocks. As is well known, the pet cocks are provided in order that, by opening said pet cocks, the level of the oil in the flywheel case may be tested, it being highly necessary to maintain a proper quantity of oil in said case for the proper lubrication of the engine. However, the pet cocks, being underneath the vehicle, are inaccessible and I have accordingly provided the present device for operating said pet cocks from a point at the adjacent side of the car.

In carrying the invention into effect, I provide a smooth rod 14 which is straight throughout the major portion of its length and is bent near it outer end to form a handle 15, the loop at one extremity of which defines a laterally extending abutment or shoulder 16. Integrally formed on or otherwise secured to the rod at its opposite end is a flattened oblong socket 17 the top and bottom walls as well as the side walls of which converge toward the inner end of the socket while the said side walls are also curved transversely and thus present concave faces within the socket. Surrounding the rod 14 is a fibrous washer 18 limited against displacement by the shoulder 16 and overlying said washer is a metal washer 19. Freely surrounding the rod to bear at one end against the socket 17 and at its opposite end against the washer 19, is a spring 20, of a normal length equal to the distance between the shoulder 16 and the socket. In assembling the device, the spring is first slipped over the handle 15 when the washers 18 and 19 are then applied in like manner.

To apply the device, the running board shield 11 is formed with a single opening 21 opposite the pet cocks 12 and 13, when the handle 15 of the rod 14 is slipped through said opening from the inner side of the shield and the socket 17 engaged over the flattened thumb piece or handle of the valve of one of the pet cocks. The spring 20 will thus be compressed between the socket and the washer 19 for holding the socket engaged with the valve while the washer 18 will be pressed against the inner side of the shield 11 supporting the outer end of the rod to eliminate rattling. Thus, the handle 15 of the rod may be grasped for turning the rod and opening the pet cock. In Figure 1 of the drawings, I have shown the socket 17 of the rod engaged with the valve of the pet cock 12. However, should it be desired to operate the pet cock 13, the handle 15 is grasped and the rod pulled outwardly to disengage the socket from the valve of the pet cock 12 when the rod is tilted downwardly and guided, as the rod is allowed to return inwardly under the pressure of the spring 20, to direct the socket over the thumb piece of the valve of the pet cock 13. The spring will then function to hold the socket engaged with the valve of the pet cock 13 so that the handle of the rod may be operated for turning the valve and opening the pet cock. Thus, the single device may be employed to operate both pet cocks and, in this connection, particular attention is directed to the fact that by employing a long spring, as illustrated, the spring is adapted to compensate for the relative spacing of the pet cocks so that the spring will thus hold the socket 17 in engagement with the valve of either pet cock with substantially equal force. Furthermore, by employing the long spring, it becomes unnecessary to aperture the rod or form the rod with a shoulder in order to secure the spring at its inner end and by providing the shoulder 16 at the outer end of the rod, the spring, as well as the washers 18 and 19, will be limited against accidental displacement in the shipment or handling of the device. Also, attention is directed to the fact that since the socket 17 is tapered, the socket may be readily directed over the flattened handles of the valves of the pet cocks and will wedge thereon to avoid rattling between the parts.

Having thus described the invention, what I claim is:

In a motor vehicle, the combination with a flywheel case, a plurality of pet cocks applied to the flywheel case, and a running board shield having a single opening, of means for selectively operating the pet cocks, consisting of a rod mounted in the opening of the shield and having a socket at its inner end, and having its outer end bent laterally to engage the shield and rebent to provide a cross handle, a spring mounted upon the rod and confined between the socket at the inner end thereof and the said shield, a metal washer on the rod to sustain the thrust at the outer end of the spring, and a fibrous washer between the shield and the metal washer to deaden noise.

In testimony whereof I affix my signature.

JOHN W. GAULT. [L. S.]